United States Patent
Stojanovski

(10) Patent No.: US 7,527,459 B2
(45) Date of Patent: May 5, 2009

(54) TOOL HOLDER ASSEMBLY WITH POLYGONAL DRIVE MEMBER

(76) Inventor: Stojan Stojanovski, 13300 W. Star Dr., Shelby Township, MI (US) 48315

(*) Notice: Subject to any disclaimer, the term of this patent is extended or adjusted under 35 U.S.C. 154(b) by 156 days.

(21) Appl. No.: 11/619,666

(22) Filed: Jan. 4, 2007

(65) Prior Publication Data
US 2008/0166198 A1    Jul. 10, 2008

(51) Int. Cl.
*B23Q 3/12* (2006.01)
(52) U.S. Cl. .................. 409/234; 279/8; 408/239 R
(58) Field of Classification Search ........... 409/232, 409/234; 279/8, 102, 103; 408/231, 233, 408/226, 238, 239 A, 239 R
See application file for complete search history.

(56) References Cited

U.S. PATENT DOCUMENTS

| | | | |
|---|---|---|---|
| 1,571,260 A * | 2/1926 | Gairing | 408/201 |
| 2,383,688 A * | 8/1945 | Seiter | 279/8 |
| 4,002,347 A | 1/1977 | Wanner et al. | |
| 4,557,642 A * | 12/1985 | Dudas et al. | 408/239 R |
| 4,748,879 A | 6/1988 | von Haas | |
| 4,799,838 A * | 1/1989 | Kubo et al. | 409/234 |
| 4,834,597 A | 5/1989 | Andersson et al. | |
| 4,934,883 A | 6/1990 | Andersson et al. | |
| 5,340,248 A | 8/1994 | Ensbergs | |
| 5,551,811 A | 9/1996 | Satran et al. | |
| 5,800,098 A | 9/1998 | Satran et al. | |
| 6,599,068 B1 * | 7/2003 | Miyazawa | 409/234 |
| 6,971,825 B2 * | 12/2005 | Stojanovski | 409/233 |
| 6,974,287 B2 | 12/2005 | Neumeier | |
| 7,131,802 B2 * | 11/2006 | Pantzar | 409/234 |
| 7,284,938 B1 * | 10/2007 | Miyazawa | 409/231 |
| 2005/0095076 A1 | 5/2005 | Pantzar | |
| 2005/0135892 A1 * | 6/2005 | Tang | 409/234 |

* cited by examiner

*Primary Examiner*—Daniel W Howell
(74) *Attorney, Agent, or Firm*—Steve M. Clemmons

(57) ABSTRACT

A tool holder assembly having a tool holder and a cutting tool. The cutting tool has a stepped shank that is matingly received within the lower end of the tool holder. The stepped shank is separated into distinct sections, including: a wedging section having conical mating surfaces, a drive section having polygonal cross-sections, and a cylindrical anti-tipping section. The drive section has a plurality of walls that run parallel to the longitudinal axis of the assembly.

12 Claims, 5 Drawing Sheets

TOOL HOLDER ASSEMBLY WITH POLYGONAL DRIVE MEMBER

BACKGROUND AND SUMMARY OF THE INVENTION

This invention is related to a tool holder assembly having a tool holder and an interlocking cutting tool. The tool holder assembly is connected to a conventional drive spindle. The tool holder includes a cone that is received in a rotating spindle. An elongated body extends from the cone. The cutting tool includes a stepped shank that is telescopically received in the body. A threaded fastener joins the cutting tool to the tool holder body by drawing the cutting tool into a contoured axial opening in the body.

The cutting tool shank and the axial opening include complementary polygonal drive sections that ensure that there are multiple flat surfaces that create an interference fit upon rotation of the cutting tool and resist deflection when the cutting tool is cutting.

Several forms of chucking structures are known for connecting a cutting tool to a rotating spindle, generally using a tapered body that is received in a tapered opening in the spindle.

Art that has addressed this problem include U.S. Pat. No. 4,834,597 issued May 30, 1989 and U.S. Pat. No. 4,934,883 issued Jun. 19, 1990 to Andersson et al.; U.S. Patent Publication No. 2005/0095076 published May 5, 2005 to Pantzar; U.S. Pat. No. 4,7478,879 issued Jun. 7, 1988 to von Hass; and U.S. Pat. No. 5,340,248 issued Aug. 23, 1994 to Ensbergs.

One drawback of some of these prior art tool holders is that their tapered interface between cutting tool and tool holder permit the tool to tilt about or move along the tapered sections (i.e., about an axis that is perpendicular to the longitudinal axis of the tapered section) and become misaligned.

The broad purpose of the present invention is to provide a tool holder chucking structure comprising a minimal number of components while providing a positive drive member and limiting movement of the cutting tool relative to the tool holder.

One advantage of the present invention is that is provides a cutting tool to tool holder interface having two distinct sections: a tapered interface and a polygonal straight interface.

Another advantage of the present invention is that it includes a third cylindrical cutting tool to tool holder interface that resists movement of the cutting tool along the angled profile of the tapered interface.

Still another advantage of the present invention is that it provides a tool holder assembly suited to be removably received into a tapered opening in the spindle of a machine tool. The tool holder assembly including a cutting tool body having means for holding a cutting tool on one end and a shank on the opposite end. This shank includes a triangular drive section. This drive section has three interconnected walls that are each parallel to a longitudinal axis of the shank. A cylindrical shaft extends axially from the drive section and includes a threaded axial bore. The tool holder assembly also includes a tool holder body having an external tapered wall formed about an axial opening and receivable in an opening of a rotatable drive spindle. The axial opening passes through the tool holder body and has a first end with internal threaded means for receiving a retention knob and a second end that is shaped complementary to the shank. Fastening means are also provided and are contained within the axial opening connected to the threaded bore in the cutting tool body to axially move the cutting tool toward the tool holder body and telescopically receive the shank within the second end of the tool holder body.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views, and in which.

DETAILED DESCRIPTION OF THE INVENTION

Figure 1:
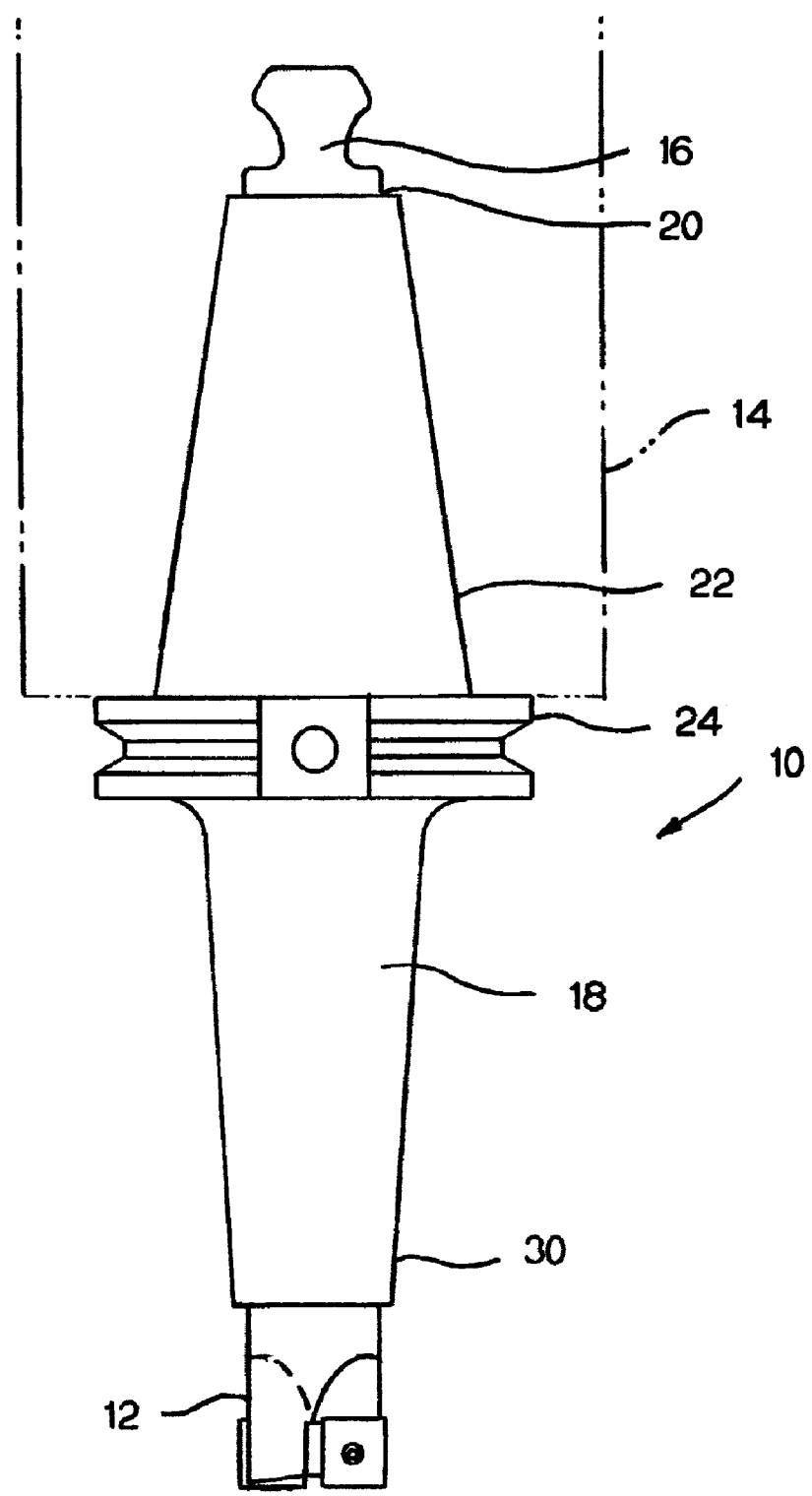
FIG. 1 illustrates a tool holder assembly embodying the invention.

FIG. 1 illustrates a preferred tool holder assembly 10 for joining a cutting tool 12, such as an end mill, to a rotatable drive spindle 14, shown in phantom. The tool can be any of a variety of rotatable cutting tools. The spindle is conventional and is used in a variety of commonly used power sources.

Tool holder assembly 10 comprises a retention knob 16, a tool holder 18, and a cutting tool 12.

Figure 2:
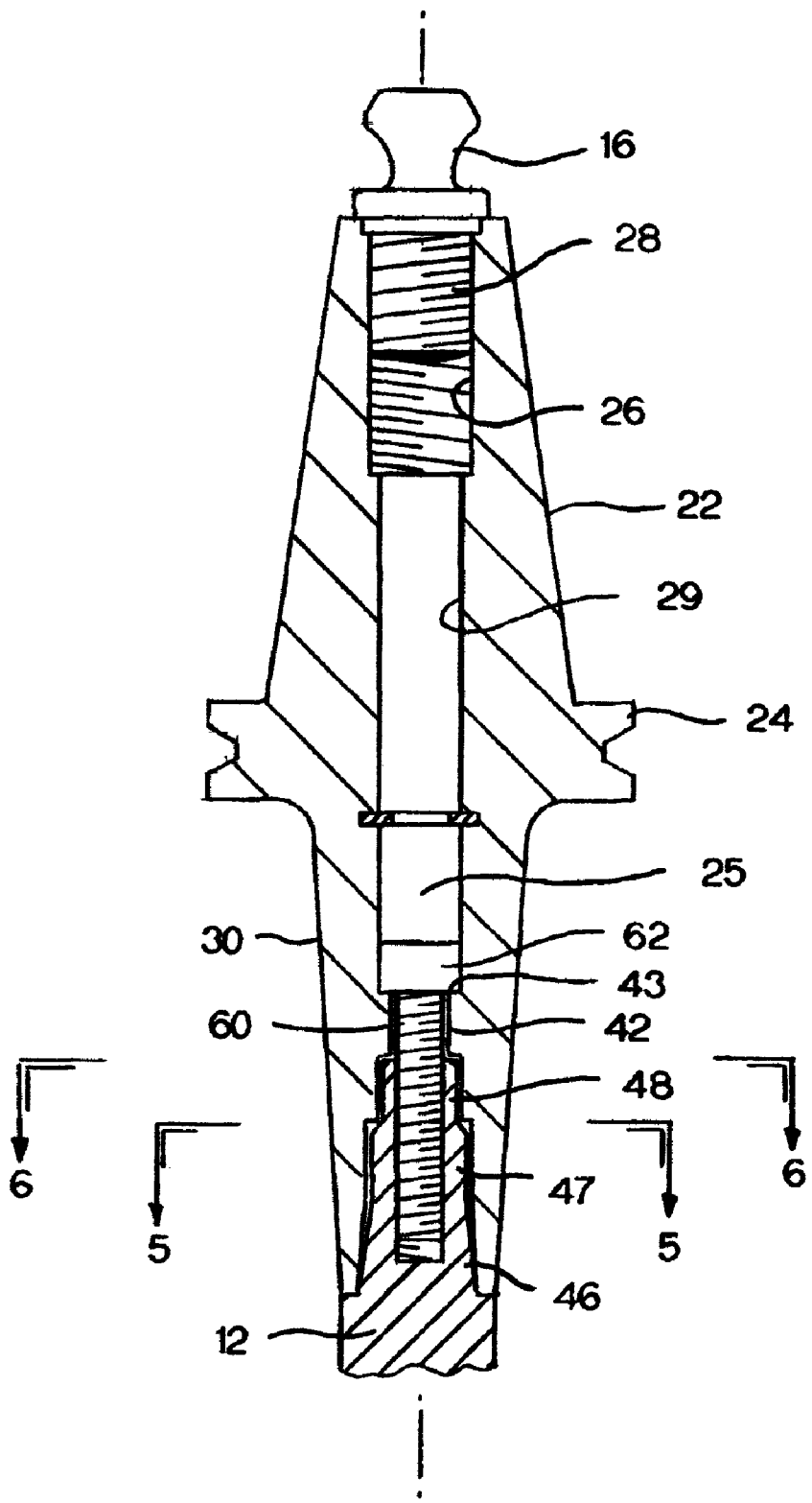
FIG. 2 is a longitudinal sectional view through the tool holder assembly of FIG. 1.

Referring to FIGS. 1 and 2, the upper end of tool holder 18 includes an upper bearing surface 20 for seating retention knob 16, and a frustoconical wall 22 which progressively enlarges in diameter to a radially projecting flange 24, such as a conventional CAT style v-flange.

Tool holder 18 has a stepped axial bore or opening 25 passing along its length. The upper end of axial bore 25 has an internally threaded section 26 which receives the lower threaded end 28 of retention knob 16. Below threaded section 26, bore 25 is defined by a cylindrical wall 29 that passes through flange 24.

A generally cylindrical elongated body 30 extends downward from flange 24. Axial bore 25 passes through body 30 and has a stepped, shank-receiving profile at its lower end that is divided into three sections 32, 33, and 34.

Figure 4:
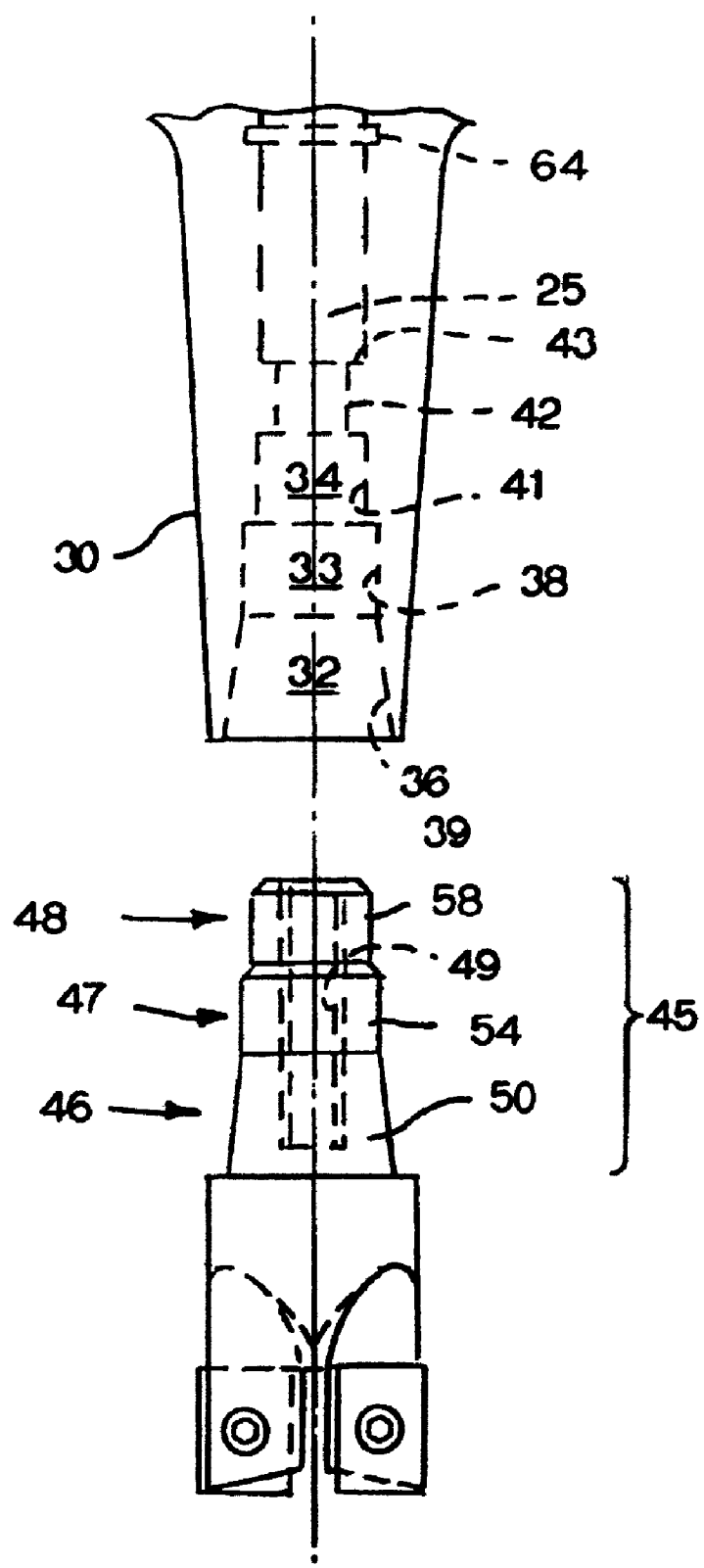
FIG. 4 is an enlarged view illustrating the manner in which the cutting tool is joined to the tool holder body.

Referring to FIGS. 2 and 4, axial bore 25 at the lower end of elongated body 30 opens into tapered or conical section 32. Walls 36 of section 32 narrow radially inward to drive section 33.

Figure 5:
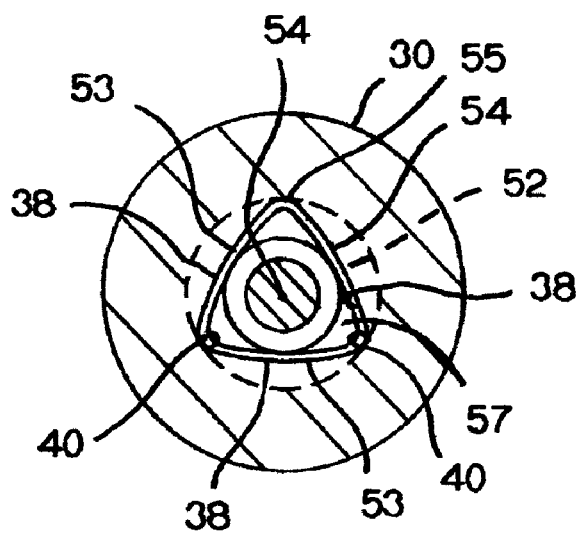
FIG. 5 is a sectional view as seen along lines 5-5 of FIG. 21, illustrating the polygonal cross-sectional shape of the drive section.

Drive section 33 of axial bore 25, as best illustrated in FIG. 5, has a polygonal shape where a plurality of interconnected walls 38 run parallel to the longitudinal axis 39 of bore 25. In the preferred embodiment, three walls 38 cooperatively define a triangular-shaped opening. The intersection 40 of two adjacent walls 38 is preferably rounded off to eliminate stress points. Additionally, each of these walls 38 is preferably curved to present a concave opening. In one embodiment, the cross-sectional shape of axial bore section 33 is a polygon having a constant-curve width, such as a Reuleaux triangle.

Figure 6:
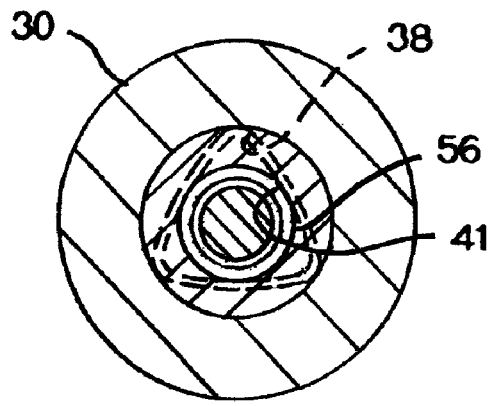
FIG. 6 is a sectional view as seen along lines 6-6 of FIG. 1, illustrating the cylindrical shape of the tilt-preventing support shaft.

Referring to FIGS. 2 and 6, drive section 33 passes into cylindrical support section 34. In section 34 of axial bore 25, the polygonal shaped walls of section 33 terminate and steps down to cylindrical wall 41. Cylindrical wall 41 is preferably equal in diameter to the incircle defined by walls 38. Section 34 narrows down at an annular flange 42 that extends into axial bore 25 to form a seat or shoulder 43.

Referring to FIGS. 1-4 and 7, cutting tool 12 is illustrated. Cutting tool 12 includes a lower end 44 that presents a cutting edge to a workpiece. It should be appreciated that lower end 44 shown in FIGS. 1, 3 and 4 as an indexable insert-based end mill is for illustrative purposes only and that any type of rotating cutting tool can be used.

The upper end of cutting tool 12 is a stepped shank 45 having three portions 46, 47, and 48 that are complementary in shape to axial bore sections 32, 33, and 34, respectively. A blind axial threaded bore 49 is formed in the upper end of shank 45 (i.e., opposite to cutting end 44).

Portion 46 extends from lower end 44 as a frustoconical wall 50 that tapers inwardly from a larger diameter where portion 46 meets lower end 44 to a circular seat 52.

Extending away from seat 52 is tool drive portion 47. Portion 47 has a polygonal shape that is complementary to drive section 33 in axial bore 25. That is, a plurality of interconnected walls 53 run parallel to the longitudinal axis 54 of cutting tool 12. In the preferred embodiment, three walls 53 cooperatively define a triangular-shaped drive member. The intersection 55 of two adjacent walls 53 (e.g., the vertices of triangular drive portion 47) is preferably rounded off to eliminate stress points. Additionally, each of these walls 53 is preferably curved to present a convex shape. In one embodiment, the cross-sectional shape of drive portion 47 is a polygon having a constant-curve width, such as a Reuleaux triangle. In this manner, the wall thickness of portion 47 remains constant to eliminate weak points.

Figure 7:
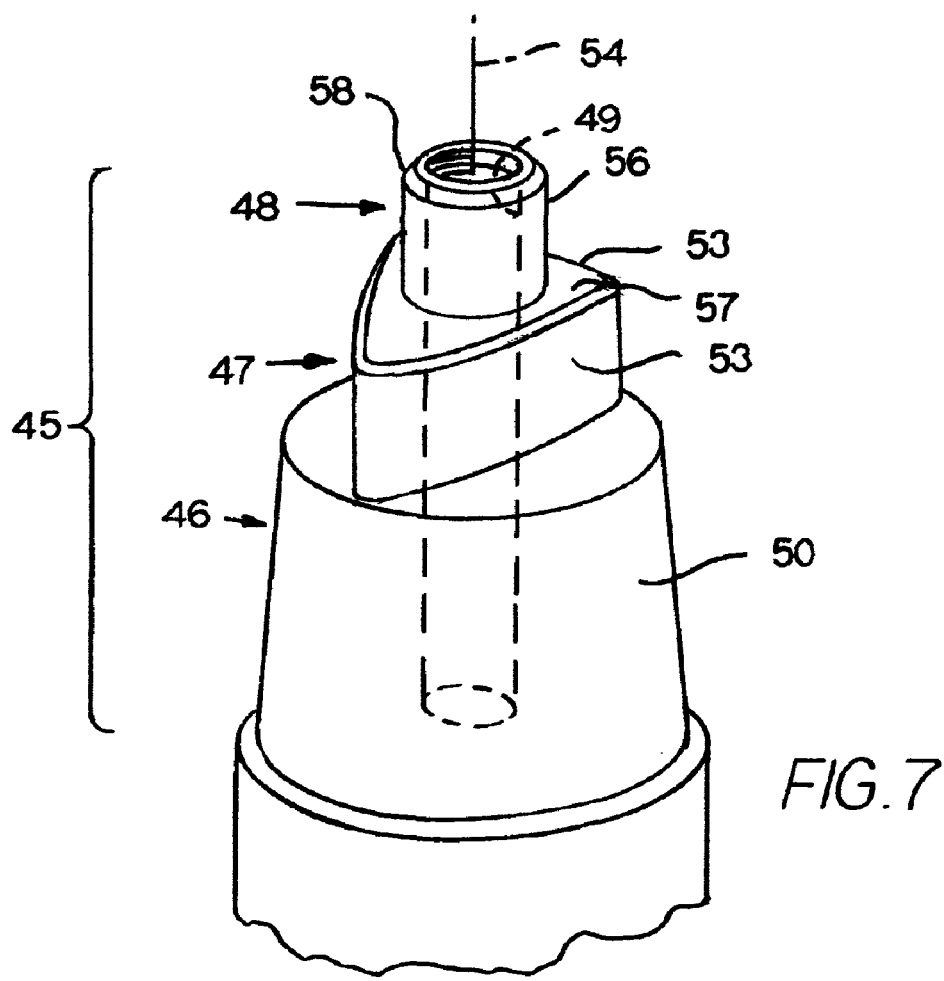
FIG. 7 is a partial perspective view of the upper end of the cutting tool.

As best shown in FIG. 7, seat 52 has a diameter that is approximately equal to the diameter of the circumcircle of polygonal section 47.

Referring to FIGS. 2, 4, and 6, upper portion 48 of shank 45 is a cylindrical support shaft 56 that extends perpendicularly from polygonal face 57. Shaft 56 is sized complementary to section 34 in axial bore 25 and is preferably a slip fit. Threaded bore 49 is formed through the upper face 58 of portion 48.

The tight fit between section 34 and support shaft 56 prevents the cutting tool from tilting or rotating along the complementary tapered surfaces 36 and 50.

Figure 3:
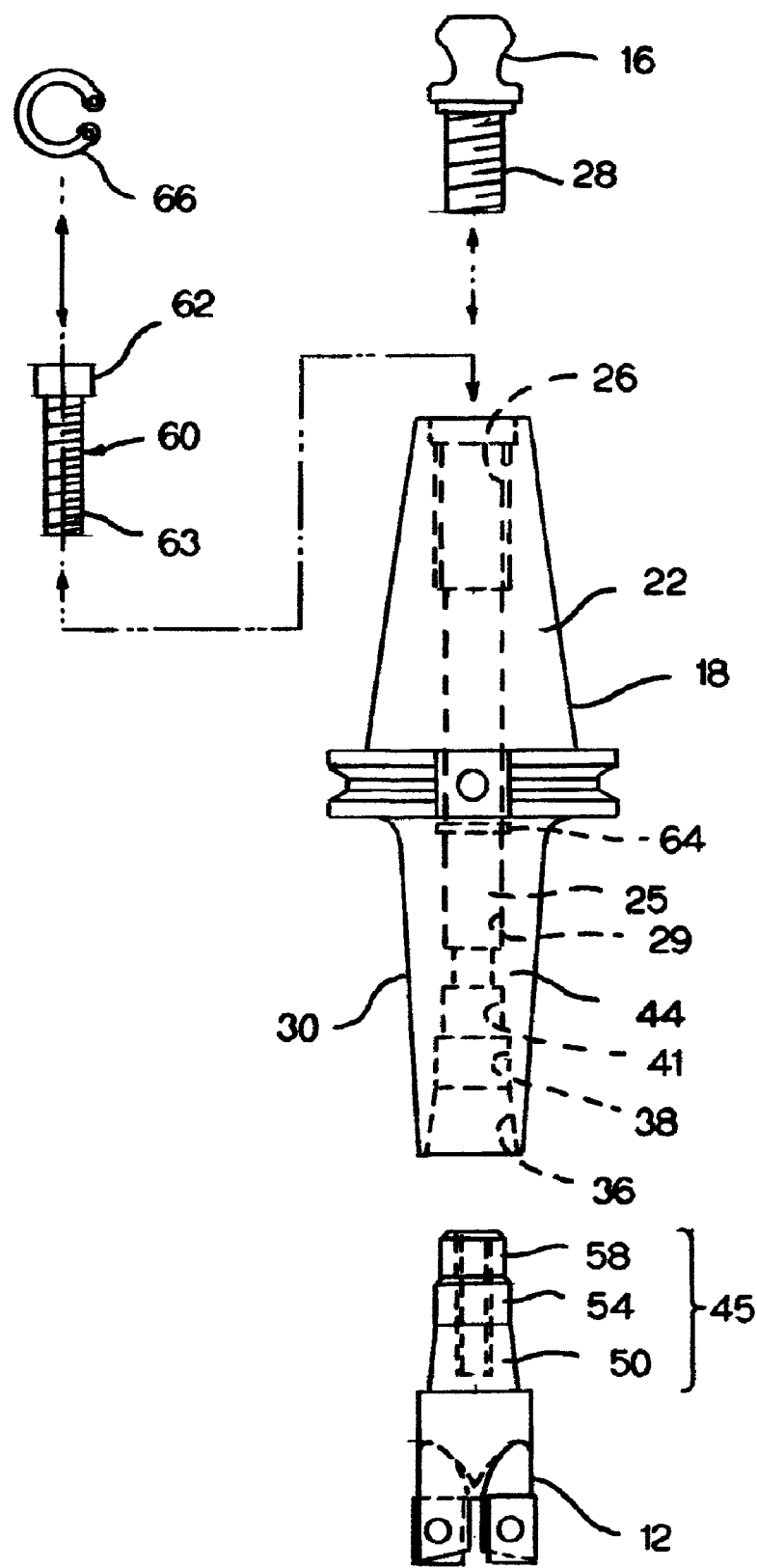
FIG. 3 is an exploded view of the major components of the tool holder assembly.

Referring to FIGS. 2 and 3, a threaded fastener 60, such as a shoulder bolt or draw bolt, having an enlarged head 62 and a threaded shaft 63 is sized to fit within axial bore 25. Head 62 abuts shoulder 43 while shaft 63 passes through flange 42 and is threadably received by threaded bore 49 of cutting tool 12. As fastener 60 is tightened, cutting tool 12 and tool holder 18 wedge together at complementary conical surfaces 36, 50.

Shank 45 is sized to be telescopically received by the lower end of axial bore 25. Portions 47 and 48 each have a height that creates a small gap between the upper faces 57 and 58 and the corresponding stepped regions of axial bore 25. In this manner, only the complementary conical surfaces of walls 36 and 50 abut when assembly 10 is assembled. In this manner, a cutting tool to tool holder arrangement between shank 45 and the lower end of axial bore 25 is provided that forms three distinct interfaces including: mating conical surfaces that are compressed together by draw bolt 60, a plurality of interference-fitting drive walls and a cylindrical support shaft that cooperates with a complementary bore to prevent cutting tool 12 from moving in any direction relative to tool holder 18.

In one preferred embodiment, axial bore 25 includes a recessed annular slot 64 formed between flange 42 and the upper end of tool holder 18. A snap ring 66, sized to removably fit within slot 64, is placed within slot 64 after fastener 60 is inserted into the axial bore. Snap ring 66 has an inner diameter that is smaller than head 62 thereby preventing fastener 60 from exiting axial bore 25.

To remove a tool 12 from tool holder 18, a user rotates fastener 60. The wedging action of conical surfaces 36, 50 initially keep the cutting tool held fast within the tool holder and the fastener 60 is pushed back toward snap ring 66. Upon reaching snap ring 66, fastener 66 cannot move any farther, and continued loosening of the fastener results in the wedged relationship between the tool and tool holder to separate and the cutting tool 12 being ejected from the tool holder due to the threaded engagement between the fastener and the cutting tool.

While the present invention has been described with particular reference to various preferred embodiments, one skilled in the art will recognize from the foregoing discussion and accompanying drawing and claims that changes, modifications and variations can be made in the present invention without departing from the spirit and scope thereof as defined in the following claims.

Having described my invention, I claim:

1. A tool holder assembly suited to be removably received into a tapered opening in the spindle of a machine tool, comprising:
 a cutting tool having cutting means on one end and a shank on the opposite end, said shank including a triangular drive section, the drive section includes three interconnected walls that are each parallel to a longitudinal axis of the shank, a cylindrical shaft extends axially from the drive section, the shaft includes a threaded axial bore;
 a tool holder body having an external tapered wall formed about an axial opening and receivable in an opening of a rotatable drive spindle, the axial opening passing through the tool holder body and has a first end with internal threaded means for receiving a retention knob and a second end that is shaped complementary to the shank said axial opening narrows between the first end and second end to form an annular seat; and
 fastening means contained within the axial opening connected to the threaded bore in the cutting tool to axially move the cutting tool toward the tool holder body and telescopically receive the shank within the second end of the tool holder body;
 wherein the axial opening has an annular channel formed between the annular seat and the first end and includes retention means that is removably seated within the channel and retains the fastening means within the cutting tool body.

2. The tool holder assembly as defined in claim 1, in which the shank includes a cone section disposed between the cutting means and the drive section, the cone section having an external conical wall that narrows from the end adjacent to the cutting means to the end that is adjacent to the drive section.

3. The tool holder assembly as defined in claim 1, in which the axial opening and the longitudinal axis of the cutting tool are aligned along a common axis.

4. The tool holder assembly as defined in claim 1, in which the drive section has a cross-section shaped as a Reuleaux triangle.

5. The tool holder assembly as defined in claim 1, wherein each intersection of adjacent walls forming the drive section is rounded.

6. A tool holder assembly suited to be removably received into a tapered opening in the spindle of a machine tool, comprising:

a cutting tool having cutting means on one end and a shank on the opposite end;

a tool holder including a spindle-mating portion having an external tapered wall that is receivable in an opening of a rotatable drive spindle, and an elongated body which extends axially from the spindle-mating portion, wherein an axial opening passes through the spindle-mating portion and body and wherein the axial opening in the body narrows to form an annular seat and is shaped complementary to the shank to define a shank-receiving end;

wherein the axial opening has an annular channel formed on the side of the annular seat opposite to the shank-receiving end, and including retention means that is removably seated within the channel and retains the fastening means within the cutting tool body;

wherein the shank including drive means that abut a portion of the axial opening within the body and prevent the cutting tool from rotating relative to a longitudinal axis of the axial opening; and fastening means contained within the axial opening connected to a threaded bore in the cutting tool body, the fastening means abuts the annular seat to axially move the cutting tool toward the tool holder to telescopically receive the shank within the body.

7. The tool holder assembly as defined in claim 6, in which the shank includes a cone section disposed between the cutting means and the drive means, the cone section having an external conical wall that narrows from the end adjacent to the cutting tool means to the end that is adjacent to the drive means.

8. The tool holder assembly as defined in claim 7, in which the shank includes a cylindrical shaft having a threaded axial bore, the shaft extends axially from the end of the drive means opposite to the cone section.

9. The tool holder assembly as defined in claim 6, in which the drive means includes a plurality of walls that run parallel to a longitudinal axis of the shank.

10. The tool holder assembly as defined in claim 9, in which the plurality of walls comprises three walls.

11. The tool holder assembly as defined in claim 10, in which the three walls form a Reuleaux triangle.

12. The tool holder assembly as defined in claim 9, in which adjacent walls meet at a rounded corner.

* * * * *